United States Patent [19]

Tsuda

[11] Patent Number: 5,252,996
[45] Date of Patent: Oct. 12, 1993

[54] ELECTROPHOTOGRAPHIC RECORDING APPARATUS AND METHOD CAPABLE OF RECORDING BOTH CHARACTERS AND SOLID BLACK PICTURE IMAGES

[75] Inventor: Yukio Tsuda, Tokyo, Japan

[73] Assignee: Kabushiki Kaisha Toshiba, Kawasaki, Japan

[21] Appl. No.: 760,016

[22] Filed: Sep. 13, 1991

[30] Foreign Application Priority Data

Sep. 18, 1990 [JP] Japan .................................. 2-246049

[51] Int. Cl.⁵ ...................... G01D 15/14; H04N 1/23; G03G 15/04
[52] U.S. Cl. .................................... 346/160; 355/214; 358/448; 358/455
[58] Field of Search ................. 355/208, 214; 346/160; 358/448, 455, 457, 465, 466

[56] References Cited

U.S. PATENT DOCUMENTS

| | | | |
|---|---|---|---|
| 4,864,357 | 9/1989 | Matsunawa et al. | 358/80 X |
| 4,879,577 | 11/1989 | Mabrouk et al. | 355/208 |
| 4,935,822 | 6/1990 | Kubota | 358/451 |
| 4,967,211 | 10/1990 | Colby et al. | 346/160 |

Primary Examiner—Fred L. Braun
Attorney, Agent, or Firm—Finnegan, Henderson, Farabow, Garrett & Dunner

[57] ABSTRACT

An electrophotographic recording apparatus includes an exposing device for exposing a photosensitive member according to image data, a developing device for developing an electrostatic latent image created on the exposed photosensitive member, and a fixing device for fixing the developed image, and the exposing device includes an image data processing circuit for converting discontinuous black-level pixels included in the pixels of the image data which is constructed by a plurality of pixels selectively including black-level pixels and white-level pixels to a white level to create processed image data, and a line scanner for line-scanning the photosensitive member by a plurality of times according to the image data and the processed imaged data each time an image of one line is created so as to create an electrostatic latent image corresponding to a combination of the image data and the processed image data on the photosensitive member.

12 Claims, 3 Drawing Sheets

ELECTROPHOTOGRAPHIC RECORDING APPARATUS AND METHOD CAPABLE OF RECORDING BOTH CHARACTERS AND SOLID BLACK PICTURE IMAGES

BACKGROUND OF THE INVENTION

1. Field of the Invention

This invention relates to an electrophotographic recording apparatus such as an LED printer having an exposing device for exposing a photosensitive member to light emitted from a light emitting device such as a light emitting diode (LED) according to image data.

2. Description of the Related Art

An electrophotographic recording apparatus such as an LED printer effects the exposing operation of forming an electrostatic latent image corresponding to image data on a photosensitive member by selectively setting a large number of light emitting diodes constituting an LED array into the activated and non-activated states and exposing the photosensitive member to light emitted from the activated light emitting diodes.

In the electrophotographic recording system, after the above exposing operation, the developing, transfer and fixing operations are effected. At this time, if each of black pixels constituting an electrostatic latent image created on the photosensitive member by the exposing operation has a diameter A, for example, toners are attached to the electrostatic latent image in a larger area than the electrostatic latent image in the developing operation. That is, the diameter of a toner image for one pixel becomes B which is larger than A. The toner image is further extended i the following transfer operation and fixing operation.

Thus, the size of the pixel recorded on the paper sheet becomes relatively larger than that of the pixel of the electrostatic latent image. As a result, the peripheral portions of toner images of adjacent pixels are overlapped with each other to provide a solid black image of high black concentration (for example, not less than 1.0 O.D.). However, in a case where a picture image is recorded by use of the artificial half tone such as dither, that is, when the half tone is created by selectively removing the black pixels, the toner will extend out of one pixel area so that preferable gradation cannot be attained. Further, when small characters are recorded, the recorded characters may be crushed.

Therefore, it is considered to reduce the size of the pixel of the electrostatic latent image and set the toner image of one pixel within the pixel area by reducing an amount of emitted light of the light emitting diode or reducing the period of light emitting time. In this case, preferable half tone can be attained, but when the solid black picture image is recorded, gaps are made between the pixels, thus making it impossible to attain sufficiently high solid black concentration.

As described above, in the prior art, it is difficult to record both the picture images such as characters and images of artificial half tone (such as dither) created by dispersedly arranged pixels and the picture images such as solid black picture images created by densely arranged pixels in good conditions.

SUMMARY OF THE INVENTION

An object of this invention is to provide an electrophotographic recording apparatus capable of recording both of the picture images such as characters and picture images of artificial half tone and the picture images such as solid black picture images in good conditions and recording both of the above picture images in good conditions even if both of the picture images are present in one page of picture image.

According to this invention, there is provided an electrophotographic recording apparatus comprising a photosensitive member; an exposing device for exposing the photosensitive member according to image data; a developing device for developing an electrostatic latent image on the exposed photosensitive member; and a fixing device for fixing the developed image; wherein the exposing device includes a line scanner for line-scanning the photosensitive member by a plurality of times according to the same image data constructed by a plurality of pixels; and an isolated dot canceling circuit for replacing the discontinuous black pixels of image data corresponding to the half tone of the picture image by the white level at least every other line and supplying the same to the line scanner.

As described above, in this invention, the line-scanning operation is effected by plural times, for example, twice according to the same image data, the original image data in the first line-scanning operation is exposed as it is, and in the next line-scanning operation, the discontinuous black pixels corresponding to the half tone are replaced by the white level so that the solid black picture image can be created with high black concentration by overlapping of the toner images and the half tone can be realized with preferable gradation since the toners are set within one pixel area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
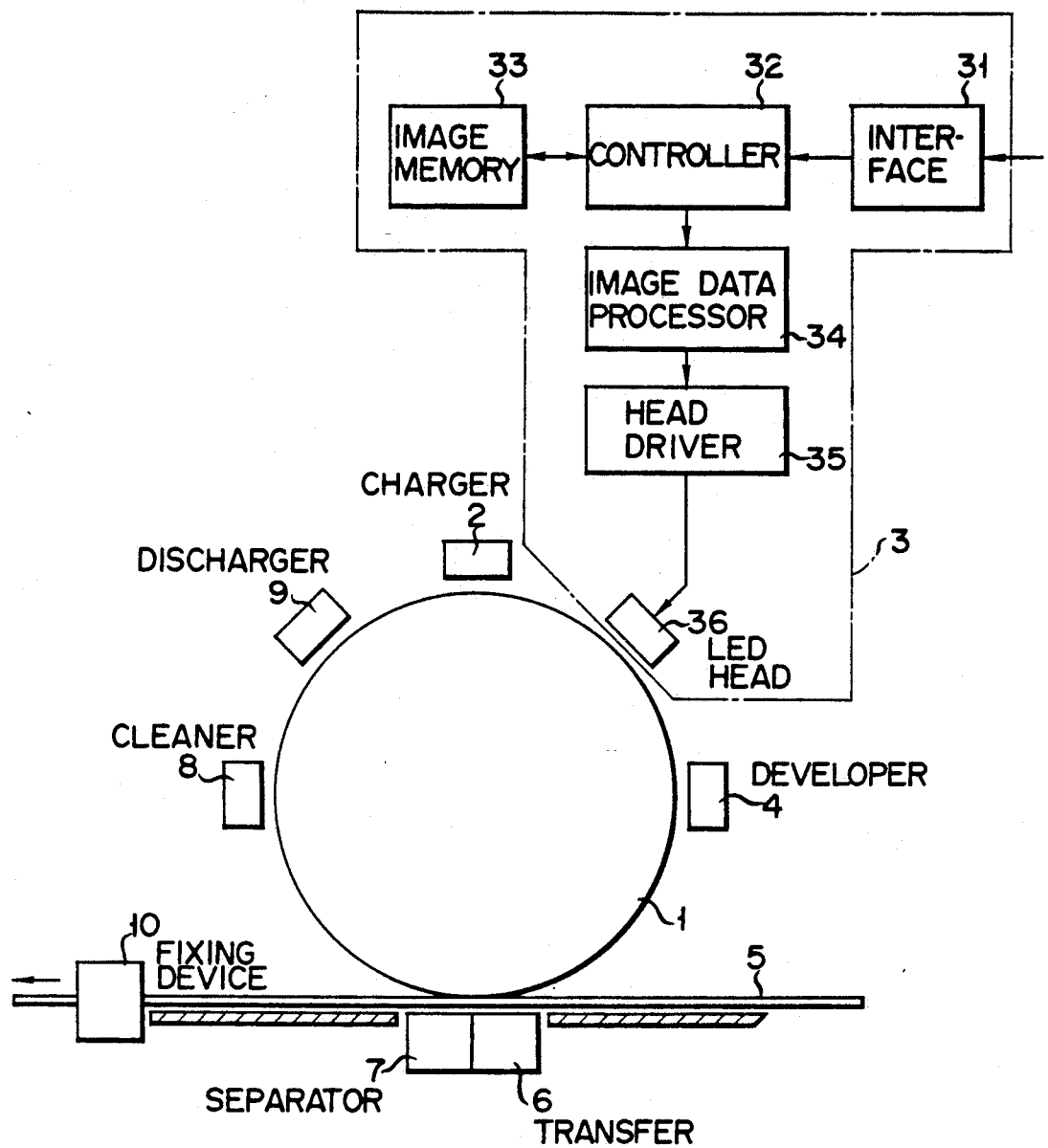
FIG. 1 is a view schematically showing an LED printer serving as an electrophotographic recording apparatus according to one embodiment of this invention.

According to an electrophotographic recording apparatus or an LED printer, a charging device 2 for uniformly charging a cylindrical photosensitive drum 1, an exposing device 3 for exposing the photosensitive drum 1 charged by the charging device 2 according to image data to create an electrostatic latent image on the photosensitive drum 1, a developing device 4 for developing the electrostatic latent image into a visible image by attaching toners onto the electrostatic latent image created on the photosensitive drum 1 by the exposing device 3 in a positive image developing method, a transfer device 6 for transferring the toners attached on the photosensitive drum 1 by the developing device 4 to a paper sheet 5, a separation device 7 for separating the paper sheet 5 from the photosensitive drum 1, a cleaning device 8 for removing toners which are not transferred to the paper sheet 5 and left behind on the photosensitive drum 1, a discharging device 9 for discharging the residual charges on the photosensitive drum 1, and a fixing device 10 for fixing the toners transferred to the paper sheet 5 by the transfer device 6 on the paper sheet 5 are arranged along the peripheral surface of the photosensitive drum 1 to record an image on the paper sheet according to the well-known electrophotographic recording process.

The exposing device 3 includes an interface circuit 31, control circuit 32, image memory 33, image data processing circuit 34, head driving circuit 35 and LED head 36. The interface circuit 31 receives image data transmitted from an external device (not shown) or another unit (for example, the LED printer is used in a recording section of a facsimile device, and in this case, it may be a transmission/reception device) in the printer. The image data received by the interface circuit 31 is supplied to the image memory 33 via the control circuit 32 and stored therein. The image memory 33 is a memory which can store image data of at least one page. The image data stored in the image memory 33 is sequentially read out for each page by means of the control circuit 32 and input to the image data processing circuit 34 each time image data of one page is stored.

The image data processing circuit 34 creates a processed image signal by removing isolated pixels from image data (which is hereinafter referred to as original image data) supplied from the control circuit 32 and sequentially supplies the original image data and processed image data to the head driving circuit 35 in a one-line recording period. Then, the head driving circuit 35 drives the LED head 36 according to the original image data and processed image data supplied from the image data processing circuit 34.

The LED head 36 includes an LED array having a large number of light emitting diodes linearly arranged and a rod lens array having a plurality of rod lenses linearly arranged in the same manner as the light emitting diodes, and light emitted from the light emitting diodes of the LED array is focused on the photosensitive drum 1 by means of the rod lens array. That is, the head driving circuit 35 and the LED head 36 are combined to constitute a line scanner for line-scanning the photosensitive drum 1.

Figure 2:
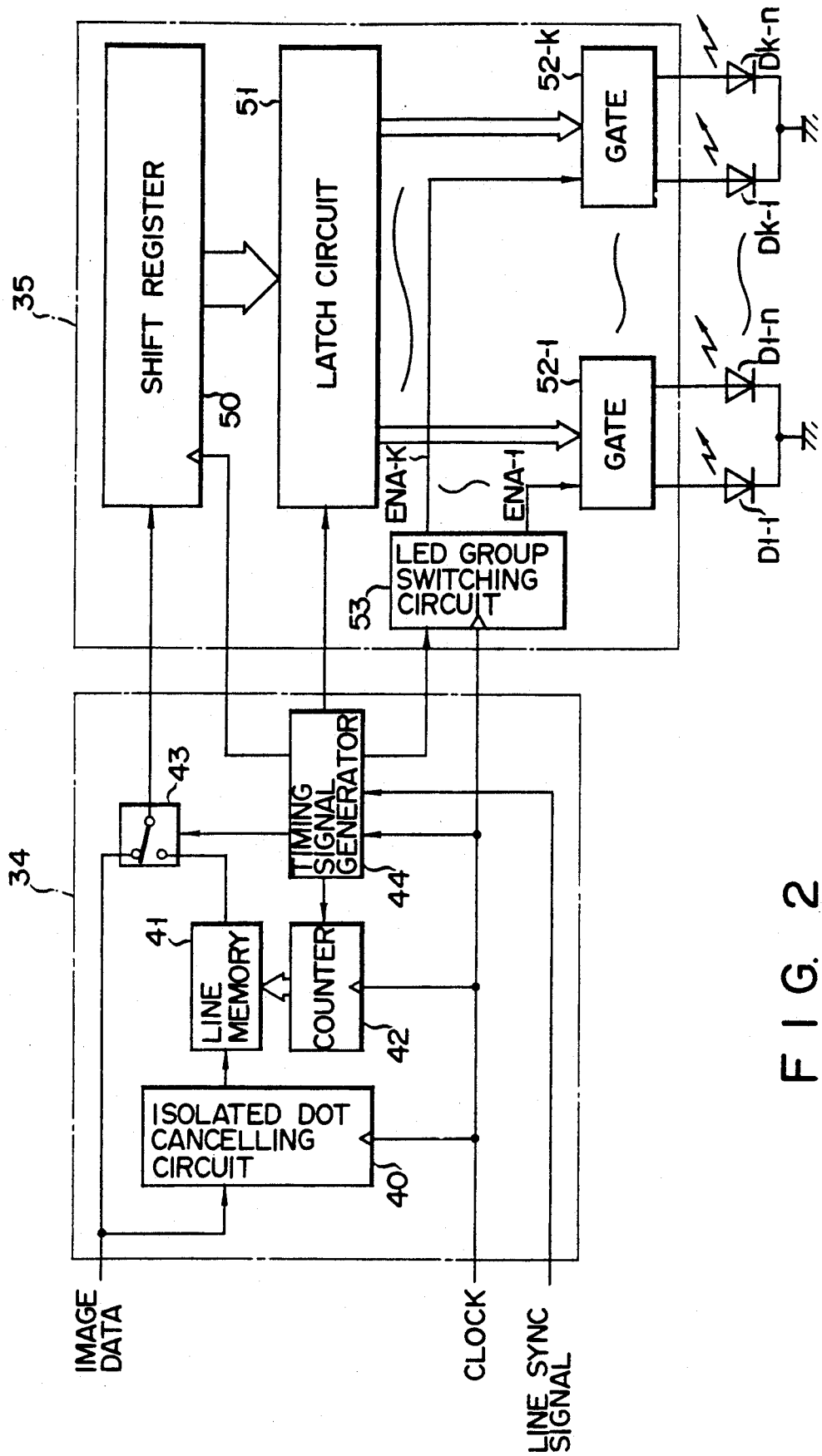
FIG. 2 is a block diagram of an image data processing unit and a head driving section shown in FIG. 1.

FIG. 2 is a block diagram showing the concrete construction of the image data processing circuit 34 and head driving circuit 35 shown in FIG. 1. As shown in FIG. 2, the image data processing circuit 34 includes an isolated dot canceling circuit 40, line memory 41, counter 42, selection switch 43 and timing generator circuit 44. The isolated dot canceling circuit 40 creates image data by removing isolated pixels in the original data supplied from the control circuit 32 or discontinuous black pixels each of which is sandwiched by adjacent white pixels, that is, it creates processed image data or image data obtained by replacing the isolated black pixels by white pixels. Creation of the processed image data is effected for each line of the original image data. The processed image data thus created by the isolated dot canceling circuit 40 is temporarily stored in the line memory 41. The counter 42 is used to specify an address for the write-in/readout of data with respect to the line memory 41.

The selection switch 43 selects one of the original image data and output data of the line memory 41 or processed image data and supplies the selected data to the head driving circuit 35.

The timing generator circuit 44 creates an operation permitting signal for the counter 42, switching signal for the selection switch 43 and clock signal, latch signal and switching timing signal for the head driving circuit 35 in response to the clock and line synchronization signal for the original image data and supplies them to the corresponding circuits.

The driving circuit 35 includes a shift register 50, latch circuit 51, gate circuits 52-1 to 52-k and block switching circuit 53. The shift register 50 has bits of the same number as the number m of the pixels of image data of one line and outputs original image data or processed image data (which are both serial data) output from the image data processing circuit 34 as m-bit parallel data.

The latch circuit 51 latches the m-bit output from the shift register 50 when it receives a latch signal from the timing generator circuit 44 of the image data processing circuit 34. The m-bit data latched by the latch circuit 51 is divided into k blocks of n bits which are respectively supplied to the k gate circuits 52-1 to 52-k.

The gate circuits 52-1 to 52-k are respectively supplied with enable signals ENA-1 to ENA-k output from the block switching circuit 53. The gate circuits 52-1 to 52-k are enabled by the respective enable signals ENA-1 to ENA-k and permit the n-bit input data to be output in parallel in the enabled condition. The output terminals of each of the gate circuits 52-1 to 52-k are respectively connected to n light emitting diodes of a corresponding one of the light emitting diode groups each including n light emitting diodes D1-1 to D1-n, —, or Dk-1 to Dk-n, and the light emitting diodes D1-1 to D1-n, —, and Dk-1 to Dk-n are respectively controlled by the outputs of the gate circuits 52-1 to 52-k. The light emitting diodes D1-1 to D1-n, —, and Dk-1 to Dk-n constitute the LED head 36.

The block switching circuit 53 sequentially sets the enable signals ENA-1 to ENA-k to the "H" level at timings determined by the switching timing signal from the timing generator circuit 44 of the image data processing circuit 34 and the clock for the image data and keeps the same at the "H" level for a preset period of time.

Next, the operation of the LED printer with the above construction is explained. First, at the record starting time for one line, the selection switch 43 is set to be connected to the original image data input line as shown in FIG. 2 and the image data processing circuit 34 is set to select and output the original image data.

In this state, original image data read out from the image memory 33 and supplied to the image data processing circuit 34 under the control of the control circuit 32 is input to the head driving circuit 35 as it is via the selection switch 43. At the same time, the original image data is input to the isolated dot canceling circuit 40. In the isolated dot canceling circuit 40, isolated black pixels in the original image data or black pixels which are each sandwiched between white pixels are replaced by white pixels so as to create processed image data. In this case, the isolated dot canceling circuit 40 determines the continuous black pixels of the original image data and the discontinuous black pixels thereof, and outputs the continuous black pixels as they are and replaces the discontinuous black pixels by white pixels.

Figure 3:
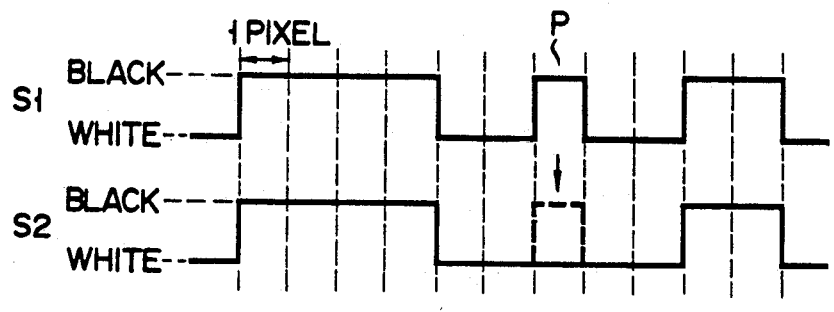
FIG. 3 is a diagram for illustrating the processing of an isolated dot canceling circuit shown in FIG. 2.

Specifically, when original image data S1 shown in FIG. 3 is input to the image data processing circuit 34, a pulse P corresponds to an isolated pixel and therefore the pulse P is replaced by the "L" level indicating white, thus creating processed image data S2.

The processed image data thus created by the above processing is temporarily stored in the line memory 41.

Figure 4:
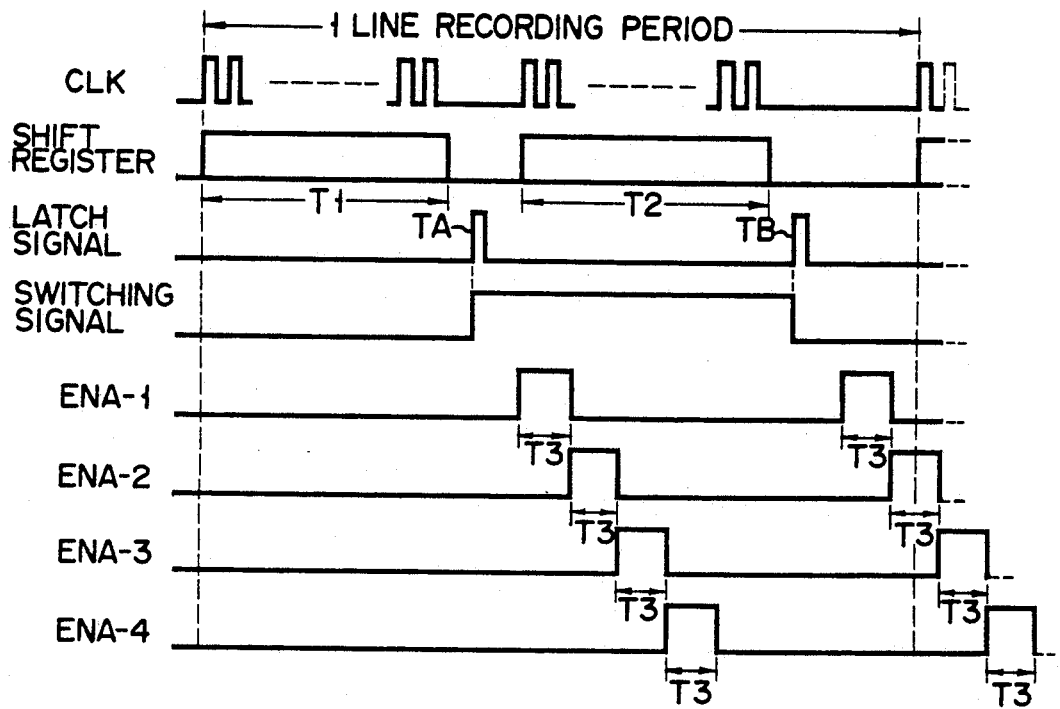
FIG. 4 is a timing chart for illustrating the operation of the circuit shown in FIG. 2.

The pixels of the original image data S1 supplied from the image data processing circuit 34 to the head driving circuit 35 are sequentially shifted in the shift register 50 and then all of the pixels of the original image data S1 of one line are stored in the shift register 50 (period T1 in FIG. 4).

After the period T1 has elapsed and all of the pixels of the original image data of one line have been stored in the shift register 50, a latch signal is output from the timing generator circuit 44 with a short delay time (at timing TA in FIG. 4). As a result, output data of the shift register 50 at timing TA, that is, one line of the original image data is simultaneously latched by the latch circuit 51. At the same time, a switch setting signal output from the timing generator circuit 44 is set to the "H" level to set the selection switch 43 in the position on the line memory 41 side or in the processed image data selection position.

Next, the timing generator circuit 44 supplies an operation permitting signal to the counter 42 after a short period of time has elapsed. The counter 42 starts the counting operation in response to the operation permitting signal. Processed image data is sequentially read out from the line memory 41 in response to the output signal from the counter 42. At this time, since the selection switch 43 is set in the position on the line memory 41 side as described before, the processed image data S2 is transferred to the head driving circuit 35. In the head driving circuit 35, the processed data S2 is shifted into the shift register 50 (period T2 in FIG. 4) in the same manner as in the operation effected in the period T1.

While the processed image data S2 is being shifted into the shift register 50 in the period T2, the block switching circuit 53 sequentially sets and keeps the enable signals ENA-1 to ENA-k (in this example, k=4) at the "H" level for a period T3 (which is set to be shorter than the light emitting period in the conventional LED printer and set to be about half the conventional light emitting period, for example). As a result, the light emitting diodes Dl-1 to Dl-n, —, and Dk-1 to Dk-n of the LED head 36 are sequentially driven for each block. Data used at this time for driving the light emitting diodes Dl-1 to Dk-n or data latched in the latch circuit 51 is the original image data, and the light emitting diodes Dl-1 to Dk-n are driven according to the original image data S1 so as to expose the photosensitive drum 1 according to a light image of one line corresponding to the original image data S1.

Then, after the period T2 has elapsed, a latch signal is output from the timing generator circuit 44 with a short delay time (at timing TB in FIG. 4). As a result, output data of the shift register 50 at timing TB, that is, one line of the original image data S2 is simultaneously latched by the latch circuit 51. At the same time, a switch setting signal output from the timing generator circuit 44 is set to the "L" level to set the selection switch 43 in the original image data selection position.

After this, the block switching circuit 53 sequentially sets and keeps the enable signals ENA-1 to ENA-k at the "H" level for a period T3 in the same manner as in the operation effected in the period T2. As a result, the light emitting diodes Dl-1 to Dl-n, —, and Dk-1 to Dk-n of the LED head 36 are sequentially driven for each block. Data used at this time for driving the light emitting diodes Dl-1 to Dk-n or data latched in the latch circuit 51 is the processed image data S2, and the light emitting diodes Dl-1 to Dk-n are driven according to the processed image data S2 so as to expose that portion of the photosensitive drum 1, which has been exposed according to one line of the original image data S1, according to one line of the processed image data S2.

As described above, one line of electrostatic latent image is created by effecting the exposing operation twice according to the original image data S1 and processed image data S2. In this case, since the processed data S2 is obtained by replacing the isolated black pixels of the original image data S1 by the L (white) level, the isolated black pixels are exposed in the first exposing operation which is effected according to the original image data S1 but are not exposed in the second exposing operation. That is, the isolated black pixels are subjected to the exposing operation only once in the two scanning operations. The other pixels are exposed twice according to the original image data S1 and processed image data S2. That is, the exposing time for the isolated pixels is half of that for the other pixels.

Figure 5:
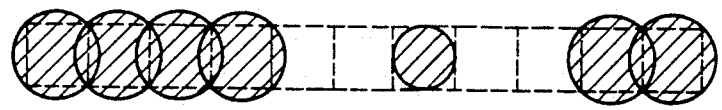
FIG. 5 is a diagram showing a picture image of one line recorded by an LED printer.

Therefore, when the developing, transfer and fixing operations ar respectively effected by the developing device 4, transfer device 6 and fixing device 10 after the above exposing operation is effected, the original image data S1 is printed on the paper 5 in the form of an image as shown in FIG. 5. That is, the isolated pixel is printed as a small pixel and the other continuous pixels are printed as large pixels.

As a result, in an area in which pixels are dispersedly arranged, that is, in an area of artificial half tone image such as dither or character, small pixels each of which does not extend out of one pixel area are created and the half tone can be reproduced in good conditions and the characters can be precisely recorded. Further, in an area in which pixels are densely disposed, that is, in an area of solid black image, pixels each of which is large enough to fill one pixel area are created so as to provide sufficiently high solid black concentration.

This invention is not limited to the above embodiment. For example, in the above embodiment, the processed data is created by removing isolated pixels, but it is possible to remove a portion including continuous black pixels of a desired number which is larger than 1 or remove a portion including continuous pixels of a number which is not larger than the desired number. Further, the exposing operation for one line is effected by effecting the exposing operation twice according to the processed image data obtained by removing the isolated pixels and the original image data, respectively, but it is possible to create a plurality of processed data items based on different conditions for a portion to be removed (for example, the portion may be an isolated pixel or two continuous pixels) and effect the exposing operation for one line by effecting the exposing operation three or more times according to the plurality of processed image data items and the original image data, respectively.

Further, in the above embodiment, the electrophotographic recording apparatus according to this invention is applied to the LED printer, but this invention can also be applied to another printer such as an LCD printer which uses a recording head having light sources arranged in an array configuration. Further, in the above embodiment, the negative image developing method is used, but the positive image developing method can be easily applied by inverting the logic.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electrophotographic recording apparatus comprising:
   a photosensitive member;
   exposing means for exposing said photosensitive member according to image data to create an electrostatic latent image corresponding to the image data on said photosensitive member;
   developing means for developing the electrostatic latent image on said exposed photosensitive member to a developed image; and
   fixing means for fixing the developed image;
   wherein said exposing means includes:
   input means for receiving the image data constructed by a plurality of pixels selectively including pixels of a first signal level and pixels of a second signal level, lower than the first signal level,
   image data processing means for converting discontinuous pixels of the first signal level included in the pixels of the image data to the second signal level to create processed image data; and
   a line scanner for line-scanning the same line of said photosensitive member a plurality of times according to the image data and the processed imaged data each time a one-line electrostatic latent image corresponding to a combination of the image data and the processed image data is formed on said photosensitive member.

2. An electrophotographic recording apparatus comprising:
   a photosensitive member;
   exposing means for exposing said photosensitive member according to image data to create an electrostatic latent image corresponding to the image data on said photosensitive member;
   developing means for developing the electrostatic latent image on said exposed photosensitive member to a developed image; and
   fixing means for fixing the developed image;
   wherein said exposing means includes:
   input means for receiving the image data constructed by a plurality of pixels selectively including black-level pixels and white-level pixels,
   image data processing means for converting discontinuous black-level pixels included in the pixels of the image data to a white-level to create processed image data; and
   a line scanner for line-scanning the same line of said photosensitive member a plurality of times according to the image data and the processed image data each time a one-line electrostatic latent image corresponding to a combination of the image data and the processed image data is formed on said photosensitive member.

3. The electrophotographic recording apparatus according to claim 2, wherein said line scanner is constructed by an optical scanner for line-scanning the same line of said photosensitive member by a plurality of times according to the image data and the processed image data.

4. The electrophotographic recording apparatus according to claim 3, wherein said line scanner is constructed by an optical scanner for line-scanning the same line of said photosensitive member twice according to the image data and the processed image data.

5. The electrophotographic recording apparatus according to claim 3, wherein said line scanner includes an optical head constructed by an array of a large number of light emitting elements.

6. The electrophotographic recording apparatus according to claim 5, wherein said line scanner includes means for dividing said light emitting elements into a plurality of groups and controlling the light emitting operation thereof for each group.

7. The electrophotographic recording apparatus according to claim 5, wherein each of said light emitting elements is constituted by a light emitting diode.

8. The electrophotographic recording apparatus according to claim 5, wherein said line scanner includes latch circuit means for sequentially latching the image data and the processed image data and sequentially supplying the latched data to said optical head.

9. The electrophotographic recording apparatus according to claim 2, wherein said image data processing means includes means for passing continuous black pixels of the image data and means for converting the discontinuous black level pixels to white level pixels.

10. The electrophotographic recording apparatus according to claim 2, wherein said exposing means includes means for alternately outputting the image data and the processed image data to said line scanner.

11. The electrophotographic recording apparatus according to claim 10, wherein said line scanner includes a shift register for temporarily storing each of the pixels of the image data and the processed image data.

12. An electrophotographic recording method comprising:
   an exposing step of exposing said photosensitive member according to image data to create an electrostatic latent image corresponding to the image data on said photosensitive member;
   a developing step of developing the electrostatic latent image on said exposed photosensitive member; and
   a fixing step of fixing the developed image;
   wherein said exposing means includes:
   a sub-step of converting discontinuous black-level pixels included in the pixels of the image data which is constructed by a plurality of pixels selectively including black-level pixels and white-level pixels to a white level to create processed image data; and
   a sub-step of line-scanning the same line of said photosensitive member by a plurality of times according to the image data and the processed imaged data each time an electrostatic latent image corresponding to a combination of the image data and the processed image data is formed on said photosensitive member.

* * * * *